(12) United States Patent
Kakuda

(10) Patent No.: US 10,978,877 B2
(45) Date of Patent: Apr. 13, 2021

(54) MANAGEMENT SYSTEM, MANAGEMENT METHOD, POWER CONVERSION APPARATUS, AND MANAGEMENT APPARATUS

(71) Applicant: KYOCERA Corporation, Kyoto (JP)

(72) Inventor: Yuji Kakuda, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 289 days.

(21) Appl. No.: 16/304,129

(22) PCT Filed: May 15, 2017

(86) PCT No.: PCT/JP2017/018153
§ 371 (c)(1),
(2) Date: Nov. 22, 2018

(87) PCT Pub. No.: WO2017/204011
PCT Pub. Date: Nov. 30, 2017

(65) Prior Publication Data
US 2020/0313439 A1    Oct. 1, 2020

(30) Foreign Application Priority Data

May 24, 2016  (JP) .............. JP2016-103058

(51) Int. Cl.
*H02J 3/38*  (2006.01)
*H02J 3/32*  (2006.01)
(Continued)

(52) U.S. Cl.
CPC .............. *H02J 3/381* (2013.01); *G05B 15/02* (2013.01); *H02J 3/32* (2013.01); *H02J 7/35* (2013.01); *H02J 13/00006* (2020.01)

(58) Field of Classification Search
CPC ........ H02J 3/381; H02J 13/00006; H02J 3/32; H02J 7/35; H02J 3/38; H02J 13/00;
(Continued)

(56) References Cited

U.S. PATENT DOCUMENTS

| | | | |
|---|---|---|---|
| 10,110,004 B2 * | 10/2018 | Shim ........................ | H02J 3/38 |
| 2014/0084686 A1 * | 3/2014 | Nishibayashi .......... | H02J 3/322 |
| | | | 307/26 |

(Continued)

FOREIGN PATENT DOCUMENTS

| | | | |
|---|---|---|---|
| JP | 2012196123 A | 10/2012 | |
| JP | 2013-38143 A | 2/2013 | |

(Continued)

*Primary Examiner* — Michael C Zarroli
(74) *Attorney, Agent, or Firm* — Hauptman Ham, LLP

(57) ABSTRACT

A management system includes a management apparatus; and a power conversion apparatus configured to convert, at least one of output power from a distributed power source and input power into the distributed power source, into AC power or DC power. The management apparatus includes: a receiver configured to receive a power control message controlling the power conversion apparatus, from an external server of a business operator that manages a power system to which the distributed power source is connected; and a transmitter configured to transmit the power control message to the power conversion apparatus, and the power conversion apparatus is configured to operate without following the power control message in a predetermined state.

11 Claims, 10 Drawing Sheets

(51) Int. Cl.
*H02J 13/00* (2006.01)
*G05B 15/02* (2006.01)
*H02J 7/35* (2006.01)

(58) Field of Classification Search
CPC ......... G05B 15/02; Y02E 70/30; Y02E 40/70; Y04S 10/123; Y04S 20/12; Y02B 90/20
See application file for complete search history.

(56) References Cited

U.S. PATENT DOCUMENTS

| | | | | |
|---|---|---|---|---|
| 2015/0349587 | A1* | 12/2015 | Gong ..................... | H02J 3/381 |
| | | | | 700/286 |
| 2016/0124400 | A1* | 5/2016 | Kanayama ................ | H02J 3/38 |
| | | | | 307/116 |
| 2019/0115868 | A1* | 4/2019 | Han ........................ | H02S 40/32 |
| 2020/0287408 | A1* | 9/2020 | Kakuda .................... | H02J 3/32 |

FOREIGN PATENT DOCUMENTS

| | | | |
|---|---|---|---|
| JP | 2014-103831 | A | 6/2014 |
| JP | 2014-171359 | A | 9/2014 |
| JP | 2016-508018 | A | 3/2016 |

\* cited by examiner

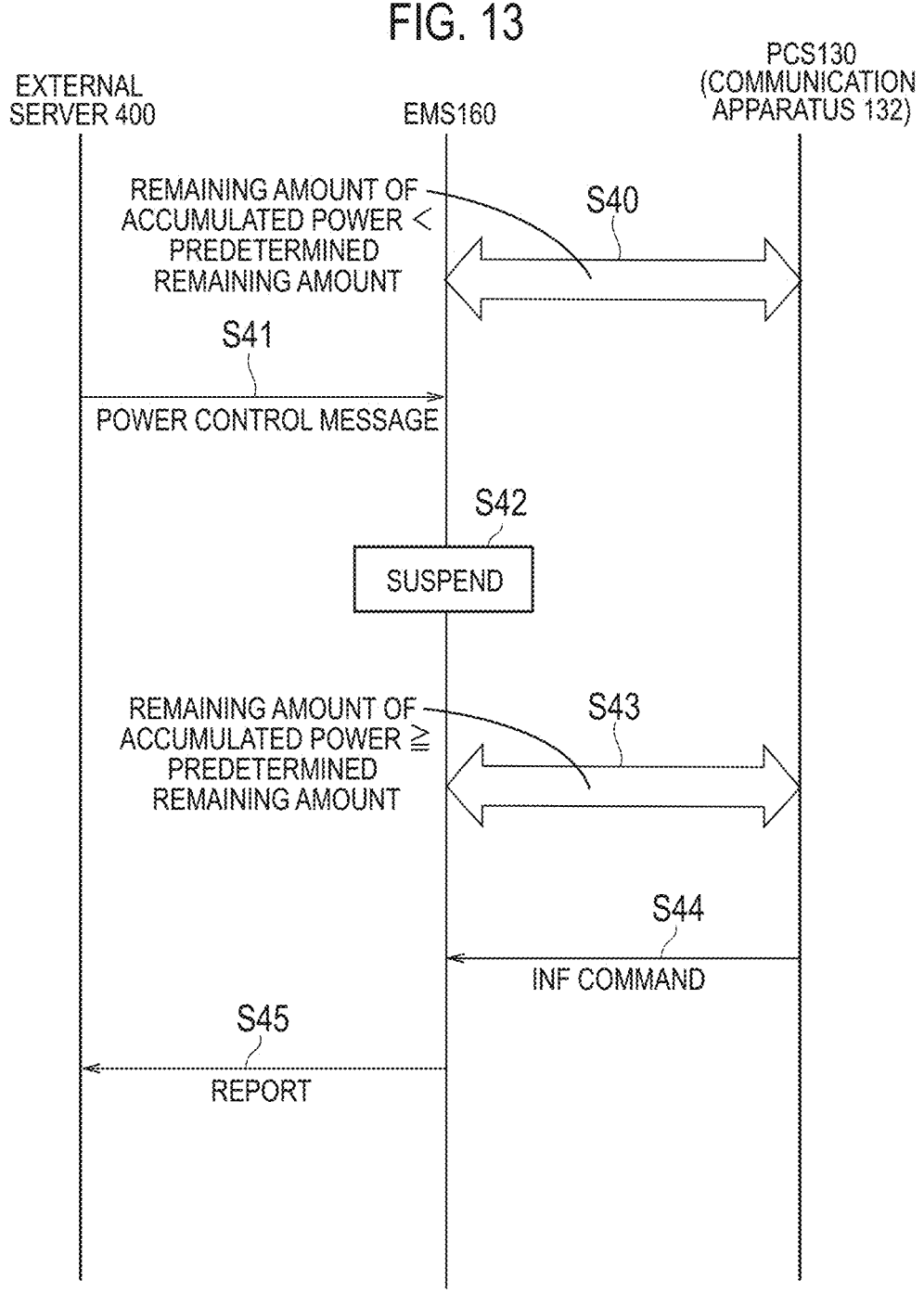

MANAGEMENT SYSTEM, MANAGEMENT METHOD, POWER CONVERSION APPARATUS, AND MANAGEMENT APPARATUS

RELATED APPLICATIONS

The present application is a National Phase of PCT/JP2017/018153, filed May 15, 2017, and claims priority based on Japanese Patent Application No. 2016-103058, filed May 24, 2016.

TECHNICAL FIELD

The present invention relates to a management system, a management method, a power conversion apparatus, and a management apparatus.

BACKGROUND ART

In recent years, a management system having a power conversion apparatus configured to control distributed power sources and a management apparatus configured to perform communication with the power conversion apparatus has been proposed (for example, Patent Literature 1). The distributed power sources are power sources such as a solar battery, a rechargeable battery, and a fuel battery.

Further, the above power conversion apparatus is configured to operate on the basis of a power control message designated by a business operator (such as electricity generation utility, electricity transmission/distribution utility, or electricity retailer).

CITATION LIST

Patent Literature

Patent Literature 1: JP 2014-171359 A

SUMMARY

A first aspect is related to a management system comprising a management apparatus; and a power conversion apparatus configured to convert, at least one of output power from a distributed power source and input power into the distributed power source, into AC power or DC power. The management apparatus comprises: a receiver configured to receive a power control message controlling the power conversion apparatus, from an external server of a business operator that manages a power system to which the distributed power source is connected; and a transmitter configured to transmit the power control message to the power conversion apparatus, and the power conversion apparatus is configured to operate without following the power control message in a predetermined state.

A second aspect is related to a management method used in a management system comprising a management apparatus, a power conversion apparatus configured to convert, at least one of output power from a distributed power source and input power into the distributed power source, into AC power or DC power, and a display apparatus configured to display a state of the power conversion apparatus. The method comprising the steps of: transmitting a power control message controlling the power conversion apparatus, from an external server of a business operator that manages a power system to which the distributed power source is connected, to the management apparatus; transmitting the power control message, from the management apparatus to the power conversion apparatus; and operating the power conversion apparatus without following the power control message in a predetermined state.

A third aspect is related to a power conversion apparatus provided in a management system comprising a management apparatus, and configured to convert, at least one of output power from a distributed power source and input power into the distributed power source, into AC power or DC power. The power conversion apparatus comprises a receiver configured to receive a power control message controlling the power conversion apparatus, from the management apparatus; and a controller configured to control an operation of the power conversion apparatus without following the power control message in a predetermined state.

A fourth aspect is related to a management apparatus provided in a management system comprising a power conversion apparatus configured to covert, at least one output power from a distributed power source and input power into the distributed power source, into AC power or DC power. The management apparatus comprises a receiver configured to receive a power control message controlling the power conversion apparatus from an external server of a business operator that manages a power system to which the distributed power source is connected; a transmitter configured to transmit the power control message to the power conversion apparatus; and a controller configured to operate the power conversion apparatus without following the power control message in a predetermined state.

BRIEF DESCRIPTION OF DRAWINGS

FIG. 13 is a sequence diagram illustrating a management method according to a first variant.

DESCRIPTION OF EMBODIMENTS

Figure 1:
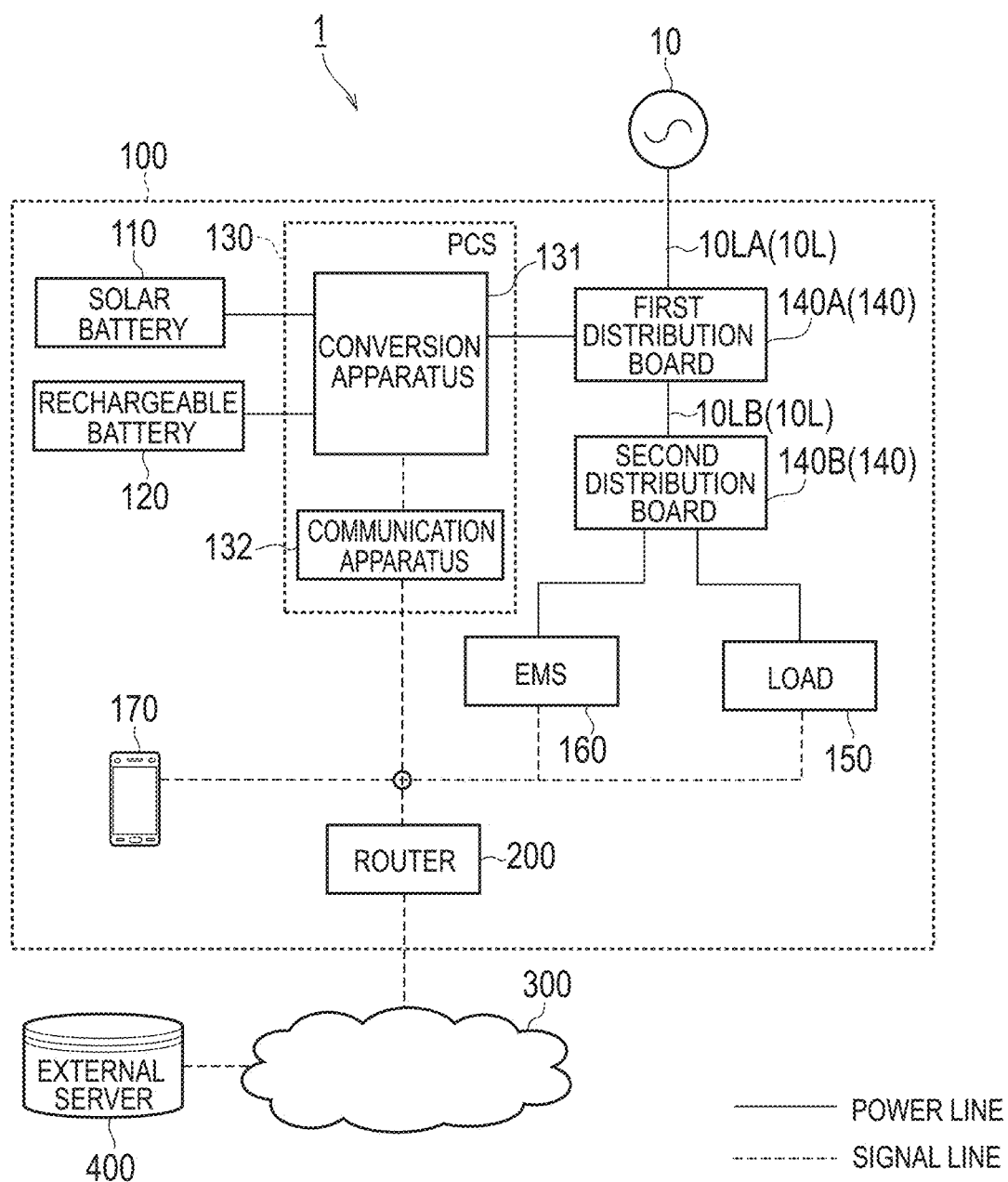
FIG. 1 is a diagram illustrating a management system 1 according to an embodiment.

An embodiment will be described below with reference to the drawings. The same or similar parts are denoted with the same or similar reference numerals in the following description of the drawings.

However, the drawings are schematic, and the ratio and the like of each dimension may be different from actual ones. Thus, the specific dimensions and the like should be determined in consideration of the following description. Parts with mutually different dimension relationships or ratios are included in the drawings.

Embodiment (Management System)

A management system according to an embodiment will be described below. As illustrated in FIG. 1, a management system 1 has a facility 100, an external server 400. The facility 100 has a router 200. The router 200 is connected to the external server 400 via a network 300. The router 200 configures a local area network, and is connected to the respective apparatuses (such as a communication apparatus 132 in a PCS 130, a load 150, an EMS 160, and a display apparatus 170). In FIG. 1, a solid line indicates a power line and a dotted line indicates a signal line. However, it is not limited to the illustration, a signal may be transmitted on a power line.

The facility 100 has a solar battery 110, a rechargeable battery 120, the PCS 130, distribution boards 140, the load 150, the EMS 160, and the display apparatus 170.

The solar battery 110 is an apparatus configured to generate power in response to a received light. The solar battery 110 outputs generated DC power. The amount of power generated in the solar battery 110 changes depending on the amount of solar radiation on the solar battery 110. According to the embodiment, the solar battery 110 is an exemplary distributed power source, output of which is capable of being suppressed on the basis of an output suppression designated by a business operator, but it is not limited thereto, and the rechargeable battery 120 may be a distributed power source, output of which is capable of being suppressed on the basis of an output suppression designated by a business operator.

The rechargeable battery 120 is an apparatus configured to accumulate power. The rechargeable battery 120 outputs accumulated DC power. According to the embodiment, the rechargeable battery 120 will be described as an exemplary distributed power source, output of which is not capable of being suppressed on the basis of an output suppression designated by a business operator, but is not limited thereto and may be a distributed power source, output of which is capable of being suppressed.

The PCS 130 is an example of an power conversion apparatus (PCS: Power Conditioning System) configured to convert, at least one output power from a distributed power source and input power into the distributed power source, into AC power or DC power. According to the embodiment, the PCS 130 has a conversion apparatus 131 and the communication apparatus 132.

The conversion apparatus 131 converts DC power from the solar battery 110 into AC power, and converts DC power from the rechargeable battery 120 into AC power. Further, the conversion apparatus 131 converts AC power from a power system 10 into DC power. The conversion apparatus 131 is connected to a main power line 10L (a main power line 10LA and a main power line 10LB herein) connected to the power system 10 via a first distribution board 140A, and is connected to both the solar battery 110 and the rechargeable battery 120. The main power line 10LA is a power line connecting the power system 10 and the first distribution board 140A, and the main power line 10LB is a power line connecting the first distribution board 140A and a second distribution board 140B. Additionally, a hybrid power conversion apparatus in which the conversion apparatus 131 is connected to the solar battery 110 and the rechargeable battery 120 will be described according to the present embodiment, but there may be configured such that power conversion apparatuses are connected to the solar battery 110 and the rechargeable battery 120, respectively. If there is configured such that power conversion apparatuses are connected to the solar battery 110 and the rechargeable battery 120, respectively, the respective power conversion apparatuses can control similarly to the hybrid power conversion apparatus according to the present embodiment.

The communication apparatus 132 is connected to the conversion apparatus 131, receives various messages to the conversion apparatus 131, and transmits various messages from the conversion apparatus 131. The communication apparatus 132 serves as both a receiver and a transmitter. Communication between the communication apparatus 132 and the conversion apparatus 131 uses a protocol (such as unique protocol) applied to the PCS 130.

According to the embodiment, the communication apparatus 132 is connected to the router 200 in a wired or radio manner. The communication apparatus 132 is connected to the external server 400 via the router 200, and receives an output suppression message for instructions to suppress an output of a distributed power source from the external server 400. Second, the communication apparatus 132 is connected to the EMS 160 via the router 200, and performs communication for predetermined commands in a predetermined format with the EMS 160. The predetermined format is not particularly limited, and may employ the ECHONET system, the ECHONET Lite system, the SEP2.0 system, the KNX system, or the like, for example.

The predetermined format will be described as a format conforming to the ECHONET Lite system, for example. In such a case, the predetermined commands can be largely divided into request commands, request response commands as responses to request commands, and information notification commands, for example. The request commands are a SET command, a GET command, and the like, for example. The request response commands are a SET response command as a response to a SET command, a GET response command as a response to a GET command, and the like, for example. The information notification commands are an INF command and the like, for example.

The SET command is a command including a property for instructions to set or operate the PCS 130. The SET response command is a command indicating that the SET command is received. The GET command is a command including a property indicating a state of the PCS 130, and for acquiring the state of the PCS 130. The GET response command is a command including a property indicating a state of the PCS 130, and including information requested in the GET command. The INF command is a command including a property indicating a state of the PCS 130, and for notifying the state of the PCS 130.

The distribution boards 140 are connected to the main power line 10L. The distribution boards 140 have the first distribution board 140A and the second distribution board 140B. The first distribution board 140A is connected to the power system 10 via the main power line 10LA, and is connected to the solar battery 110 and the rechargeable battery 120 via the conversion apparatus 131. Further, the first distribution board 140A controls power output from the conversion apparatus 131 and power supplied from the power system 10 and flows the power to the main power line 10LB. The power flowing from the main power line 10LB is distributed into the respective devices (the load 150 and the EMS 160 herein) via the second distribution board 140B.

The load 150 is an apparatus which consumes the power supplied via the power line. For example, the load 150 includes apparatuses such as an air conditioner, an illumination apparatus, a refrigerator, and a TV. The load 150 may be a single apparatus, and may include a plurality of apparatuses.

The EMS 160 is an energy management system (EMS) configured to manage power information indicating power in the facility 100. The power in the facility 100 indicates power flowing in the facility 100, power purchased by the facility 100, power sold by the facility 100, or the like. Thus, the EMS 160 manages at least the PCS 130, for example.

The EMS 160 may control the amount of power generated in the solar battery 110, the amount of power charged in the rechargeable battery 120, and the amount of power discharged in the rechargeable battery 120. The EMS 160 may be configured to be integral with the distribution boards 140. The EMS 160 is an apparatus connected to the network 300, and the functions of the EMS 160 may be provided by a Cloud service via the network 300.

According to the embodiment, the EMS 160 is connected to the respective devices (such as the communication apparatus 132 in the PCS 130, and the load 150) via the router 200, and performs communication for predetermined commands in a predetermined format with the respective devices.

The EMS 160 is connected to the display apparatus 170 via the router 200, and performs communication with the display apparatus 170. The EMS 160 may communicate predetermined commands in a predetermined format with the display apparatus 170. As described above, the predetermined format conforms to the ECHONET Lite system, for example.

The display apparatus 170 displays the power information indicating the power in the facility 100. The display apparatus 170 is a smartphone, a tablet computer, a TV, a personal computer, or a dedicated terminal, for example. The display apparatus 170 is connected to the EMS 160 in a wired or radio manner, and performs communication with the EMS 160. The display apparatus 170 may communicate predetermined commands in a predetermined format with the EMS 160. The display apparatus 170 receives data required to display the power information from the EMS 160.

The network 300 is a communication network for connecting the EMS 160 and the external server 400. The network 300 may be a public communication line such as Internet. The network 300 may include a mobile communication network. Further, the network 300 may be a dedicated communication line or a general communication line. For example, if an output of the solar battery 110 is a predetermined output or more, the output can be more accurately suppressed by use of a dedicated communication line for the network 300.

The external server 400 is a server of a business operator such as electricity generation utility, electricity transmission/distribution utility, or electricity retailer. For example, the business operator designates an output suppression of the distributed power sources, and is an electricity generation utility, an electricity transmission/distribution utility, an electricity retailer, or a distributed power sources' collective manager. Specifically, the external server 400 transmits an output suppression message for instructions to suppress an output of a distributed power source. The external server 400 may transmit a power flow suppression message (demand response (DR)) for instructions to suppress a power flow from the power system 10 to the facility 100.

The output suppression message includes a target output suppression level indicating an output suppression level of a distributed power source (the solar battery 110 herein). The target output suppression level is defined depending on an output (denoted as facility recognized output) which is recognized as an output capability (such as rated output) of the PCS configured to control the distributed power sources. The target output suppression level may be indicated by an absolute value (such as ∞ kW) defined depending on the facility recognized output, may be indicated by a relative value (such as reduction by ∞ kW) relative to the facility recognized output, and may be indicated by a suppression rate (such as ∞%) relative to the facility recognized output. Additionally, as described for the facility recognized output, the facility recognized capacity [kWh] may be employed. Further, the distributed power sources may be the rechargeable battery 120 and a fuel battery.

If the output capability of a distributed power source is different from the output capability of the PCS, the facility recognized output is set at the lower output capability out of the output capabilities. If a plurality of PCSs are installed, the facility recognized output is a total of the output capabilities of the PCSs.

According to the embodiment, the output suppression message includes calendar information indicating a schedule of the output suppression of a distributed power source. In the calendar information, the schedule of the output suppression of a distributed power source may be set per 30 minutes. The calendar information may include a schedule of one day, may include a schedule of one month, or may include a schedule of one year.

According to the embodiment, a predetermined period may be defined as a maximum period in which output of a distributed power source is suppressed. The predetermined period may be days per year (day-based rule), or an accumulated time per year (accumulated time-based rule). More specifically, the predetermined period may be 30 days per year (30-day-based rule), or may be 360 hours per year (360-hour-based rule). However, the predetermined period may not be defined (designated rule). The rules are types of the output suppression of a distributed power source according to the output suppression message.

According to the embodiment, the external server 400 transmits a power control message controlling the conversion apparatus 131 to the PCS 130 via the EMS 160. The power control message may be a message controlling the conversion apparatus 131, may be a message for instructions to increase or decrease an output of the solar battery 110, or may be a message for instructions to accumulate power in or discharge the rechargeable battery 120. Further, the power control message may be an output suppression message and a power flow suppression message, but the output suppression message or the power flow suppression message may be transmitted from the external server 400 to the PCS 130 not via the EMS 160. A message for instructions to accumulate power in the rechargeable battery 120 may include the accumulated amount (kWh) of the rechargeable battery 120. A message for instructions to discharge the rechargeable battery 120 may include the discharged amount (kWh) of the rechargeable battery 120.

(Application Scenes)

The PCS 130 is configured in principle to prioritize an operation instructed by a power control message received from the external server 400 over an operation instructed by a user operation. The principle is directed to stabilizing the power system 10. However, if the principle is strictly observed, the PCS 130 cannot be appropriately controlled.

A user operation may be performed by use of a remote controller provided in the PCS 130, for example, and may be instructed by the EMS 160. An operation instructed by the EMS 160 may be performed by use of a network-connected terminal provided in the facility 100, and may be performed by use of a network-connected terminal provided outside the facility 100. Additionally, whether an instructed operation received from the external server 400 is prioritized may be determined by any operation inside or outside the facility 100. For example, whether an operation is instructed outside or inside the facility 100 is determined depending on whether the operation is instructed via a public communication line, and if the operation is instructed outside the facility 100, the instructed operation received from the external server 400 may be prioritized.

For example, in predetermined state, control of the PCS 130 in the facility 100 may be prioritized or optimized without following a power control message received from the external server 400. The predetermined state may include at least one of a power-down state of the power system 10, a self-sustained running state in which the PCS 130 is separated from the power system 10, a state in which the communication apparatus 132 receives a special instruction by a user operation, and a re-interconnection waiting time in re-interconnecting with the power system 10.

Specifically, when the power system 10 is in the power-down state, the PCS 130 operates without following a power control message. For example, when the power system 10 is in the power-down state, the PCS 130 may ignore a power control message receive from the EMS 160. Alternatively, when the power system 10 is in the power-down state, the EMS 160 may suspend transmission of a power control message received from the external server 400.

The embodiment will be further described in detail assuming that a distributed power source controlled by the PCS 130 is the rechargeable battery 120.

Figure 2:
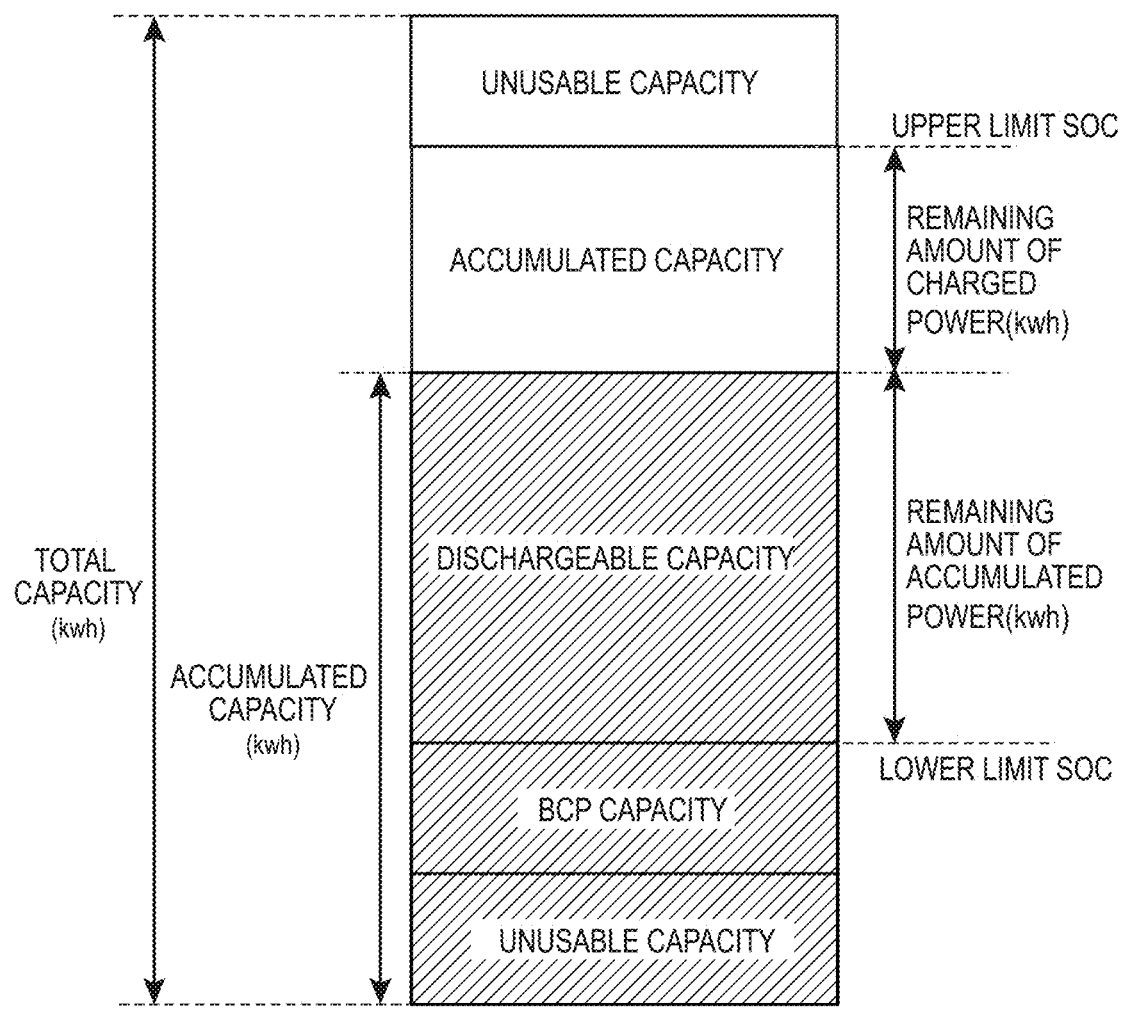
FIG. 2 is a diagram illustrating a total capacity of a rechargeable battery 120.

For example, as illustrated in FIG. 2, a lower limit state of charge (SOC) and an upper limit SOC are defined for a total capacity of the rechargeable battery 120. The lower SOC is set at the predetermined first remaining amount and the upper SOC is set at the predetermined second remaining amount higher than the first remaining amount. Further, the total capacity of the rechargeable battery 120 includes an unusable capacity for protecting the rechargeable battery 120, and a business continuity plan (BCP) capacity for an emergency situation such as disaster. The lower SOC is defined such that the accumulated capacity does not lower below the BCP capacity and the unusable capacity. The upper SOC is defined such that the accumulated capacity does not reach the unusable capacity. On the assumption, the remaining amount of accumulated power dischargeable by the rechargeable battery 120 is a value obtained by subtracting the lower SOC from the accumulated capacity. The remaining amount of charged power chargeable by the rechargeable battery 120 is a value obtained by subtracting the accumulated capacity from the upper SOC.

In such a case, when the power control message is a message for instructions to discharge and the remaining amount of accumulated power in the rechargeable battery 120 is below the first remaining amount, it is not appropriate to follow the power control message received from the external server 400. The first remaining amount may be the discharged amount instructed by the power control message, or may be zero (or accumulated capacity=lower SOC).

In terms of such a viewpoint, when the remaining amount of accumulated power in the rechargeable battery 120 is below the first remaining amount, the PCS 130 operates without following the power control message. For example, when the remaining amount of accumulated power in the rechargeable battery 120 is below the first remaining amount, the PCS 130 may ignore the power control message received from the EMS 160. Alternatively, when the remaining amount of accumulated power in the rechargeable battery 120 is below the first remaining amount, the EMS 160 may suspend transmission of the power control message received from the external server 400.

Additionally, this is similarly applicable to the upper SOC as described for the lower SOC. For example, when the remaining amount of accumulated power in the rechargeable battery 120 exceeds the second remaining amount (the upper SOC) higher than the first remaining amount, it is not appropriate to follow a power control message for promoting to charge. In this case, the PCS 130 may ignore the power control message received from the EMS 160 and the EMS 160 may suspend transmission of the power control message received from the external server 400.

As described above, the embodiment assumes that the PCS 130 operates without following a power control message. Assuming such a case, the external server 400 cannot grasp the remaining amount of accumulated power in the rechargeable battery 120. Thus, when the power system 10 returns from the power-down state to the recovery state, the EMS 160 may transmit a message indicating the remaining amount of accumulated power in the rechargeable battery 120 to the external server 400. Further, when the remaining amount of accumulated power in the rechargeable battery 120 becomes the first remaining amount or more (or the second remaining amount or less), the EMS 160 may transmit the message indicating the remaining amount of accumulated power in the rechargeable battery 120 to the external server 400.

The above description has been made assuming that the power system 10 is in the power-down state as the predetermined state, but when it is detected that the PCS 130 is separated from the power system 10 and is in the self-sustained running state as the predetermined state, the PCS 130 may ignore a power control message or the EMS 160 may suspend transmission of suspend transmission of a power control message. Whether the PCS 130 is in the self-sustained running state can be detected by a signal from the PCS 130 or a signal from a distribution board 140, for example.

Further, when the state in which the communication apparatus 132 receives a special instruction by a user operation is detected as the predetermined state, the PCS 130 may ignore a power control message or the EMS 160 may suspend transmission of a power control message. The special instruction by a user operation is an operation such as emergency stop operation, for example, and assumes that the PCS 130 is directly operated or remotely operated.

Further, when the predetermined state is the re-interconnection waiting time in re-interconnecting with the power system 10, the PCS 130 may ignore a power control message, or the EMS 160 may suspend transmission of a power control message. When the interconnection with the power system 10 is released due to power-down and then the interconnection with the power system 10 is recovered, the re-interconnection waiting time may be set, and in the re-interconnection waiting time, the PCS 130 may ignore a power control message or the EMS 160 may suspend transmission of a power control message. The re-interconnection waiting time may be set at 2 minutes to 30 minutes, for example.

(Communication Apparatus)

Figure 3:
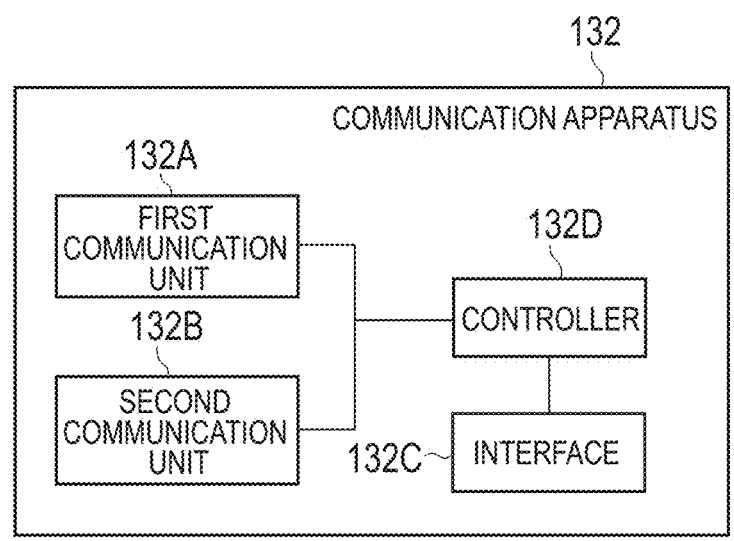
FIG. 3 is a diagram illustrating a communication apparatus 132 according to the embodiment.

The communication apparatus according to the embodiment will be described below. As illustrated in FIG. 3, the communication apparatus 132 has a first communication unit 132A, a second communication unit 132B, an interface 132C, and a controller 132D. Here, the communication apparatus 132 (or the PCS 130) is an exemplary device. The first communication unit 132A and the second communication unit 132B serve as both a receiver and a transmitter.

The first communication unit 132A receives an output suppression message or a power flow suppression message from the external server 400. According to the embodiment, the first communication unit 132A may receive an output suppression message or a power flow suppression message not via the EMS 160, and may receive an output suppression message or a power flow suppression message via the EMS 160.

The second communication unit 132B performs communication for predetermined commands in a predetermined format with the EMS 160. As described above, the predetermined format conforms to the ECHONET Lite system, for example. Here, the predetermined format used for communication between the communication apparatus 132 (the second communication unit 132B) and the EMS 160 may be different from the format used for communication between the communication apparatus 132 (the first communication unit 132A) and the external server 400. Further, the predetermined format used for communication between the second communication unit 132B (the second communication unit 132B) and the EMS 160 may be different from the format used for communication between the communication apparatus 132 (the interface 132C) and the conversion apparatus 131.

The interface 132C is an interface for the conversion apparatus 131. The interface 132C may be a wired interface and may be a wireless interface. A protocol (such as unique protocol) applied to the PCS 130 is used for communication between the communication apparatus 132 and the conversion apparatus 131.

The controller 132D is configured of a memory and a CPU, and controls the communication apparatus 132. For example, the controller 132D controls the conversion apparatus 131 by use of the interface 132C thereby to control an output of a distributed power source according to an output suppression message. The controller 132D acquires a state of the conversion apparatus 131 (such as the amount of power generated in the solar battery 110, the amount of power accumulated in the rechargeable battery 120, or the amount of power discharged in the rechargeable battery 120) from the conversion apparatus 131 by use of the interface 132C. The controller 132D generates a command to control the conversion apparatus 131 on the basis of a command received from the EMS 160, and outputs the command to the conversion apparatus 131 by use of the interface 132C.

(Management Apparatus)

Figure 4:
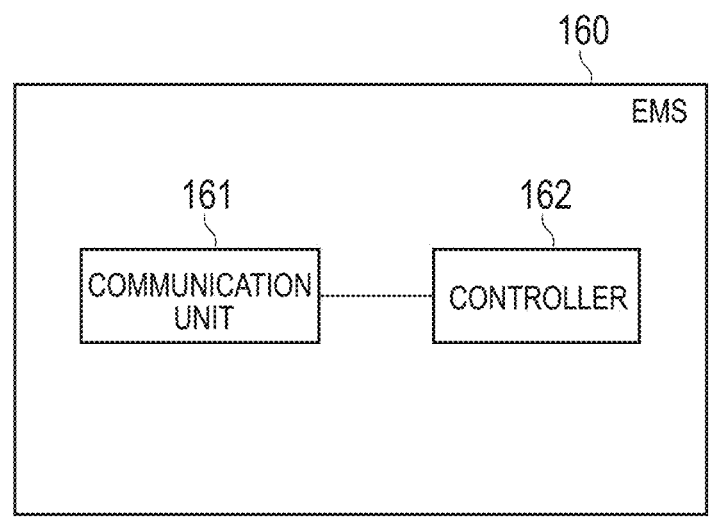
FIG. 4 is a diagram illustrating an EMS 160 according to the embodiment.

The management apparatus according to the embodiment will be described below. As illustrated in FIG. 4, the EMS 160 has a communication unit 161 and a controller 162.

The communication unit 161 performs communication for predetermined commands in a predetermined format with the communication apparatus 132. As described above, the predetermined format conforms to the ECHONET Lite system, for example.

The controller 162 is configured of a memory and a CPU, and controls the EMS 160. The controller 162 may control the amount of power generated in the solar battery 110, the amount of power charged in the rechargeable battery 120, and the amount of power discharged in the rechargeable battery 120.

Here, the controller 162 causes the PCS 130 to operate without following a power control message in the predetermined state. For example, the controller 162 controls the communication unit 161 to suspend transmission of a power control message to the PCS 130 in the predetermined state.

(Message Format)

The message format according to the embodiment will be described below. There will be described herein a case where the predetermined format conforms to the ECHONET Lite system.

Figure 5:
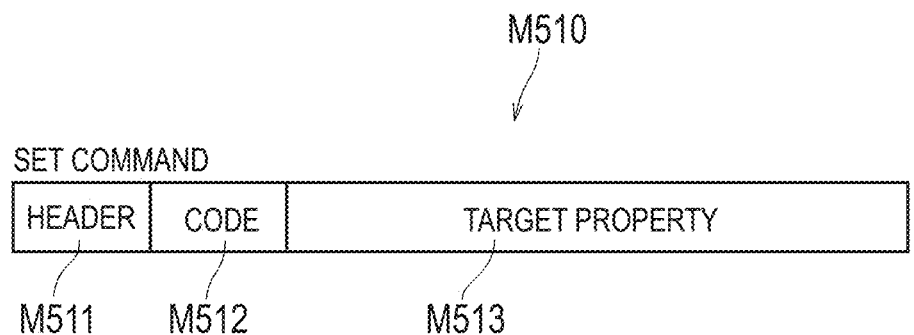
FIG. 5 is a diagram illustrating an exemplary SET command according to the embodiment.

As illustrated in FIG. 5, a SET command M510 includes a header M511, a code M512, and a target property M513. According to the embodiment, the SET command M510 is an exemplary command for instructions to operate the PCS 130 in response to a power control message, and is transmitted from the EMS 160 to the PCS 130. That is, the SET command M510 may be considered as an exemplary power control message.

The header M511 is information indicating a destination and the like of the SET command M510. The code M512 is information indicating a type of a message including the code M512. The code M512 is information indicating that the message including the code M512 is a SET command herein. The target property M513 includes a property indicating an operation corresponding to instructions to the PCS 130 by the EMS 160.

Figure 6:
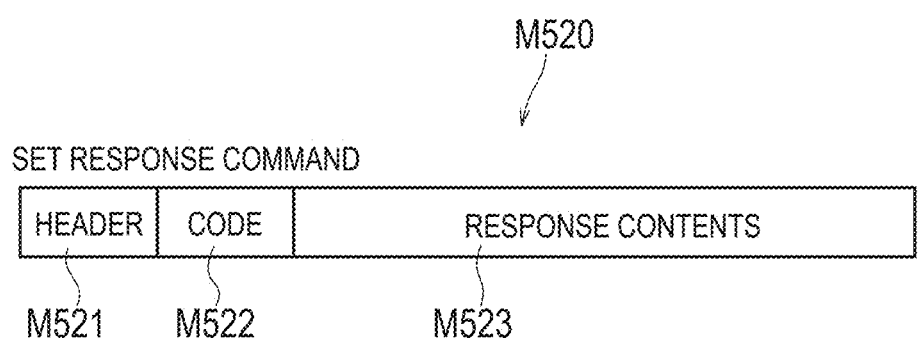
FIG. 6 is a diagram illustrating an exemplary SET response command according to the embodiment.

As illustrated in FIG. 6, a SET response command M520 includes a header M521, a code M522, and response contents M523. According to the embodiment, the SET response command M520 is an exemplary command transmitted from the PCS 130 to the EMS 160 in response to a command received from the EMS 160.

The header M521 is information indicating a destination and the like of the SET response command M520. The code M522 is information indicating a type of a message including the code M522. The code M522 is information indicating that the message including the code M522 is a SET response command herein. The response contents M523 include information indicating that the SET command is received. The information may be a copied property included in the SET command, or may be acknowledgement (ACK). Further, the information is not limited thereto, and may be a response (selective ACK) indicating that only part of data is correctly received.

Figure 7:
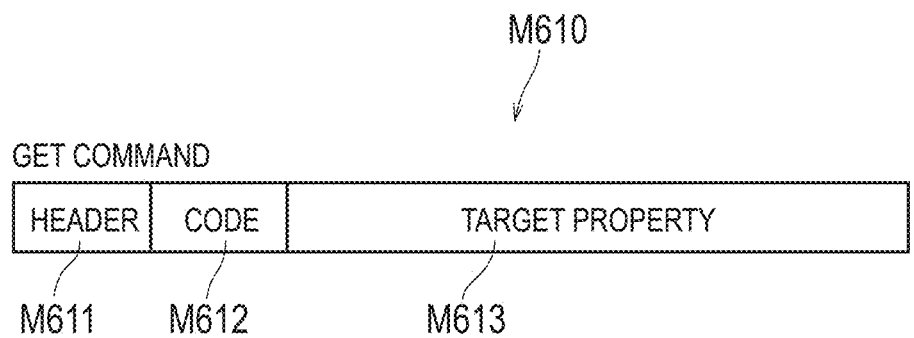
FIG. 7 is a diagram illustrating an exemplary GET command according to the embodiment.

As illustrated in FIG. 7, a GET command M610 includes a header M611, a code M612, and a target property M613. According to the embodiment, the GET command M610 is an exemplary command to request a state of the PCS 130, and is an exemplary command transmitted from the EMS 160 to the PCS 130.

The header M611 is information indicating a destination and the like of the GET command M610. The code M612 is information indicating a type of a message including the code M612. The code M612 is information indicating that the message including the code M612 is a GET command herein. The target property M613 includes a property which the EMS 160 wants to know.

Figure 8:
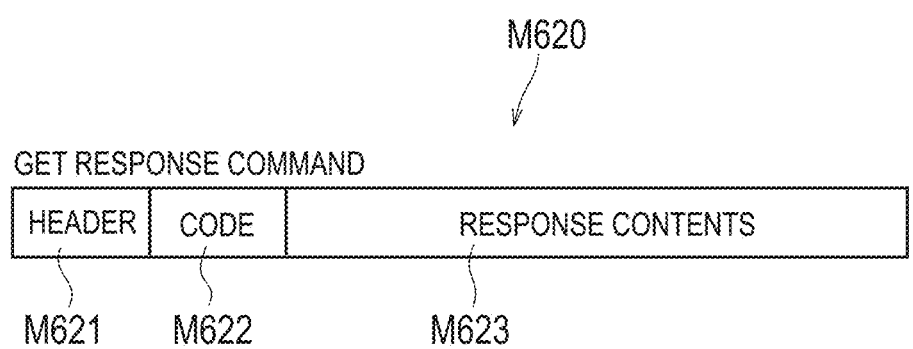
FIG. 8 is a diagram illustrating an exemplary GET response command according to the embodiment.

As illustrated in FIG. 8, a GET response command M620 includes a header M621, a code M622, and response contents M623. According to the embodiment, the GET response command M620 is an exemplary command transmitted from the PCS 130 to the EMS 160 in response to a command received from the EMS 160.

The header M621 is information indicating a destination and the like of the GET response command M620. The code M622 is information indicating a type of a message including the code M622. The code M622 is information indicating that the message including the code M622 is a GET response command herein. The response contents M623 include a property requested by the GET command.

Figure 9:
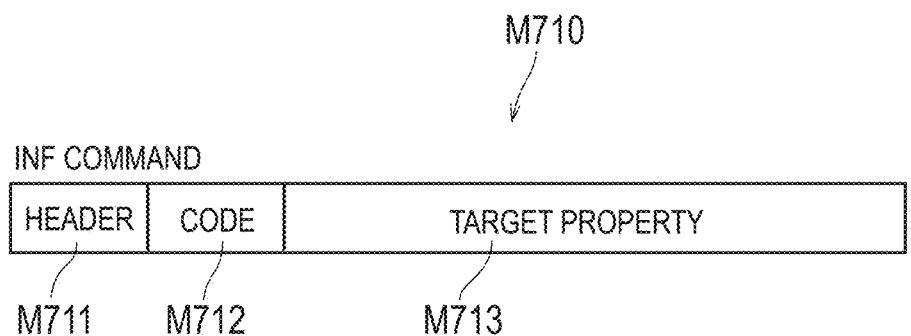
FIG. 9 is a diagram illustrating an exemplary INF command according to the embodiment.

As illustrated in FIG. 9, an INF command M710 includes a header M711, a code M712, and a target property M713. According to the embodiment, the INF command M710 is an exemplary command to notify a transmission source to the display apparatus 170, and an exemplary transmission source message transmitted from the EMS 160 to the display apparatus 170.

The header M711 is information indicating a destination and the like of the INF command M710. The code M712 is information indicating a type of a message including the code M712. The code M712 is information indicating that the message including the code M712 is an INF command herein. The target property M713 includes a property notified by the EMS 160.

(Management Method)

A management method according to the embodiment will be described below. There will be described herein a case where a predetermined format used for communication between the PCS 130 (the communication apparatus 132) and the EMS 160 conforms to the ECHONET Lite system. The rechargeable battery 120 will be assumed as a distributed power source herein.

First, a case where the PCS 130 ignores a power control message in the power-down state will be first described with reference to FIG. 10.

Figure 10:
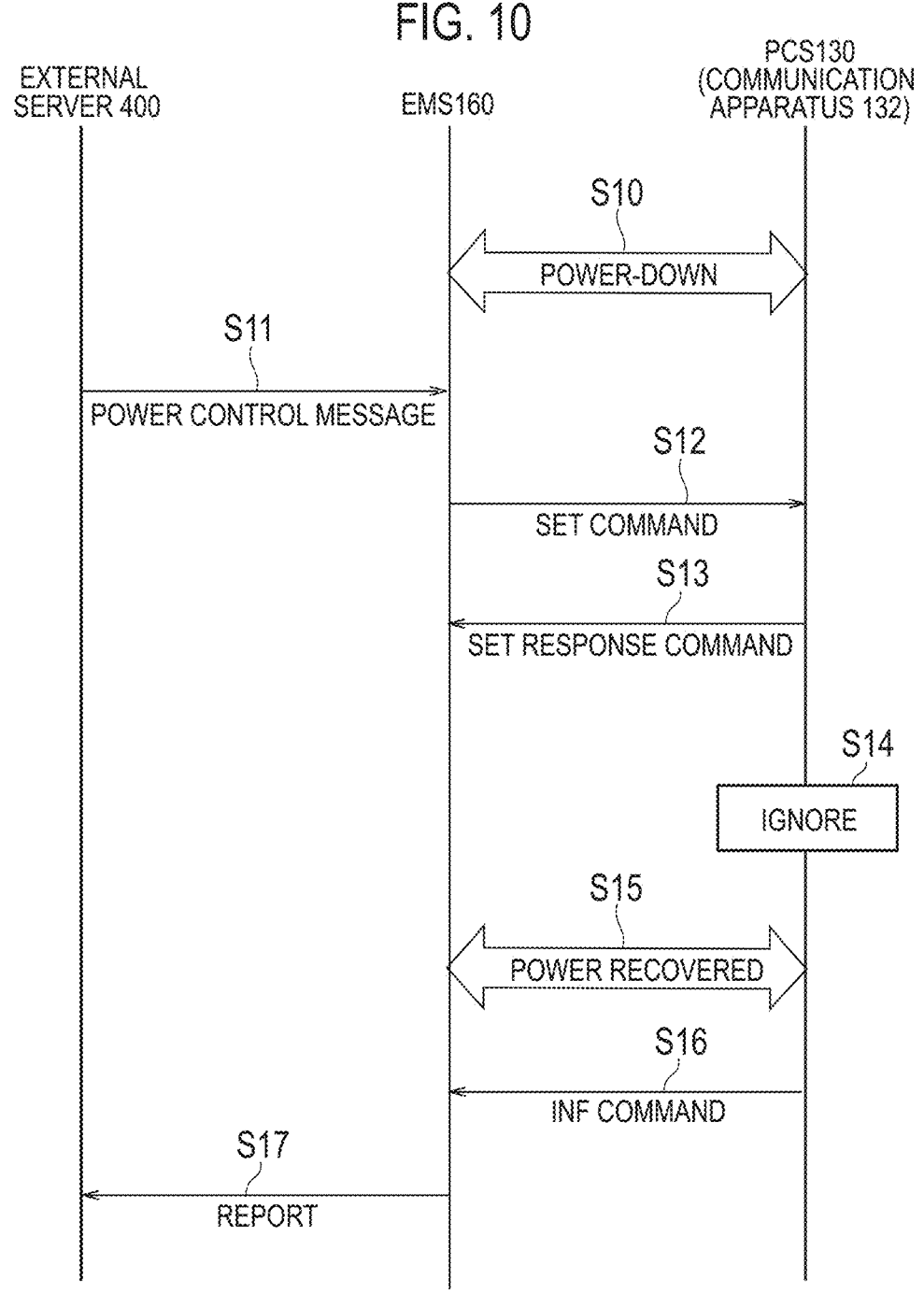
FIG. 10 is a sequence diagram illustrating a management method according to the embodiment.

As illustrated in FIG. 10, in step S10, the power system 10 is in the power-down state.

In step S11, the external server 400 transmits a power control message to the EMS 160.

In step S12, the EMS 160 transmits a SET command corresponding to the power control message to the PCS 130.

In step S13, the PCS 130 transmits a SET response command to the SET command to the EMS 160.

In step S14, the PCS 130 ignores the power control message received from the EMS 160. When ignoring the power control message, the PCS 130 may perform an operation instructed by a user operation, for example.

In step S15, the power system 10 returns from the power-down state to the recovery state.

In step S16, the PCS 130 transmits a message indicating the remaining amount of accumulated power in the rechargeable battery 120 to the EMS 160. Such a message may use an INF command described above, a GET response to a GET command from the EMS 160, or the like, for example.

In step S17, the EMS 160 transmits the message indicating the remaining amount of accumulated power in the rechargeable battery 120 to the external server 400.

Herein, when the power system 10 returns from the power-down state to the recovery state, the PCS 130 may operate in response to the SET command ignored in step S14.

Second, a case where the EMS 160 suspend transmission of a power control message in the power-down state will be described below with reference to FIG. 11.

Figure 11:
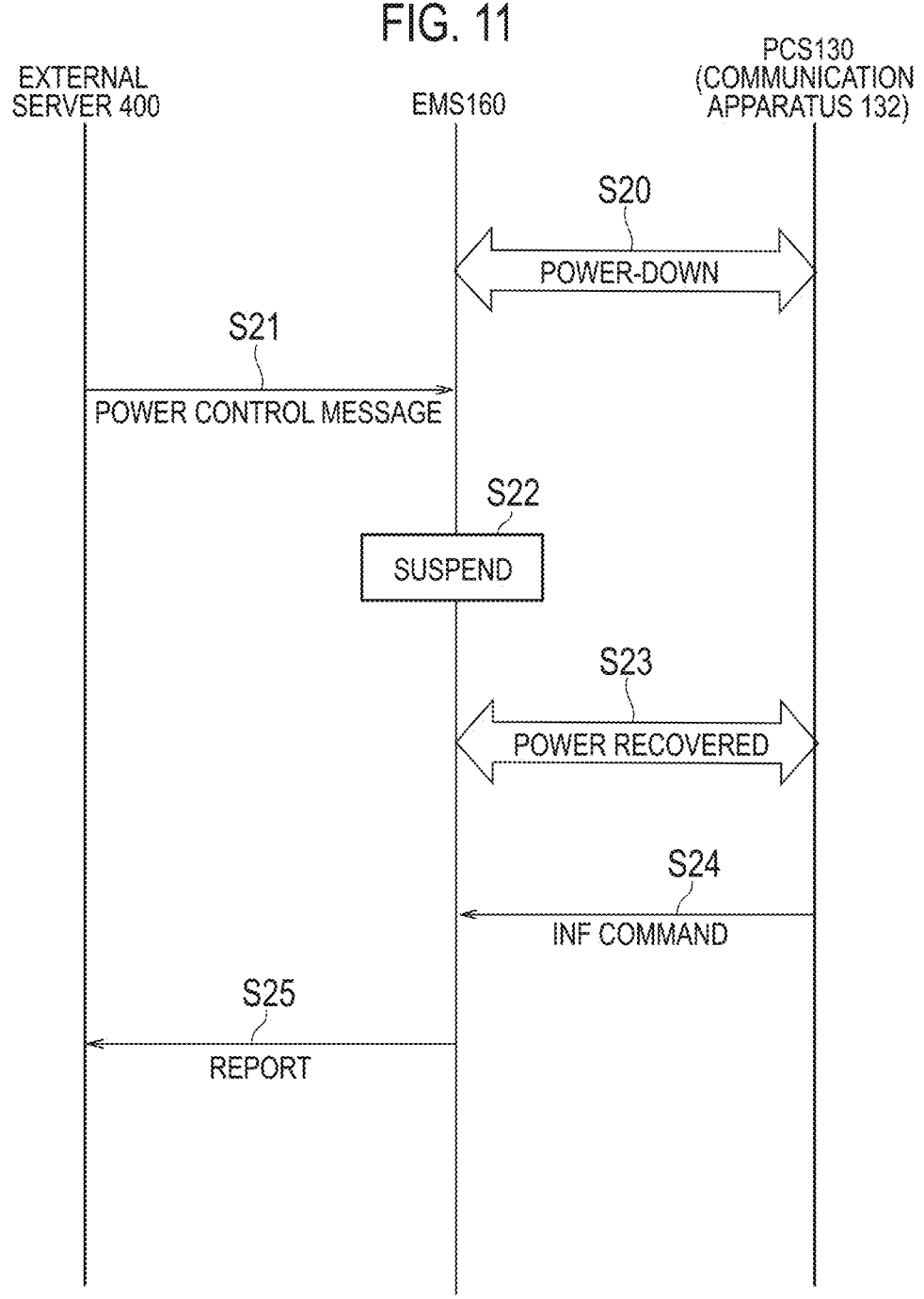
FIG. 11 is a sequence diagram illustrating the management method according to the embodiment.

As illustrated in FIG. 11, in step S20, the power system 10 is in the power-down state.

In step S21, the external server 400 transmits a power control message to the EMS 160.

In step S22, the EMS 160 suspend transmission of a SET command corresponding to the power control message. When transmission of the power control message is suspended, the PCS 130 may perform an operation instructed by a user operation, for example.

In step S23, the power system 10 returns from the power-down state to the recovery state.

In step S24, the PCS 130 transmits a message indicating the remaining amount of accumulated power in the rechargeable battery 120 to the EMS 160. Such a message is an INF command described above, for example.

In step S25, the EMS 160 transmits the message indicating the remaining amount of accumulated power in the rechargeable battery 120 to the external server 400.

Herein, when the power system 10 returns from the power-down state to the recovery state, the EMS 160 may transmit the SET command suspended in step S22.

Third, a case where the PCS 130 ignores a power control message while the remaining amount of accumulated power in the rechargeable battery 120 is below the first remaining amount will be described with reference to FIG. 12.

Figure 12:
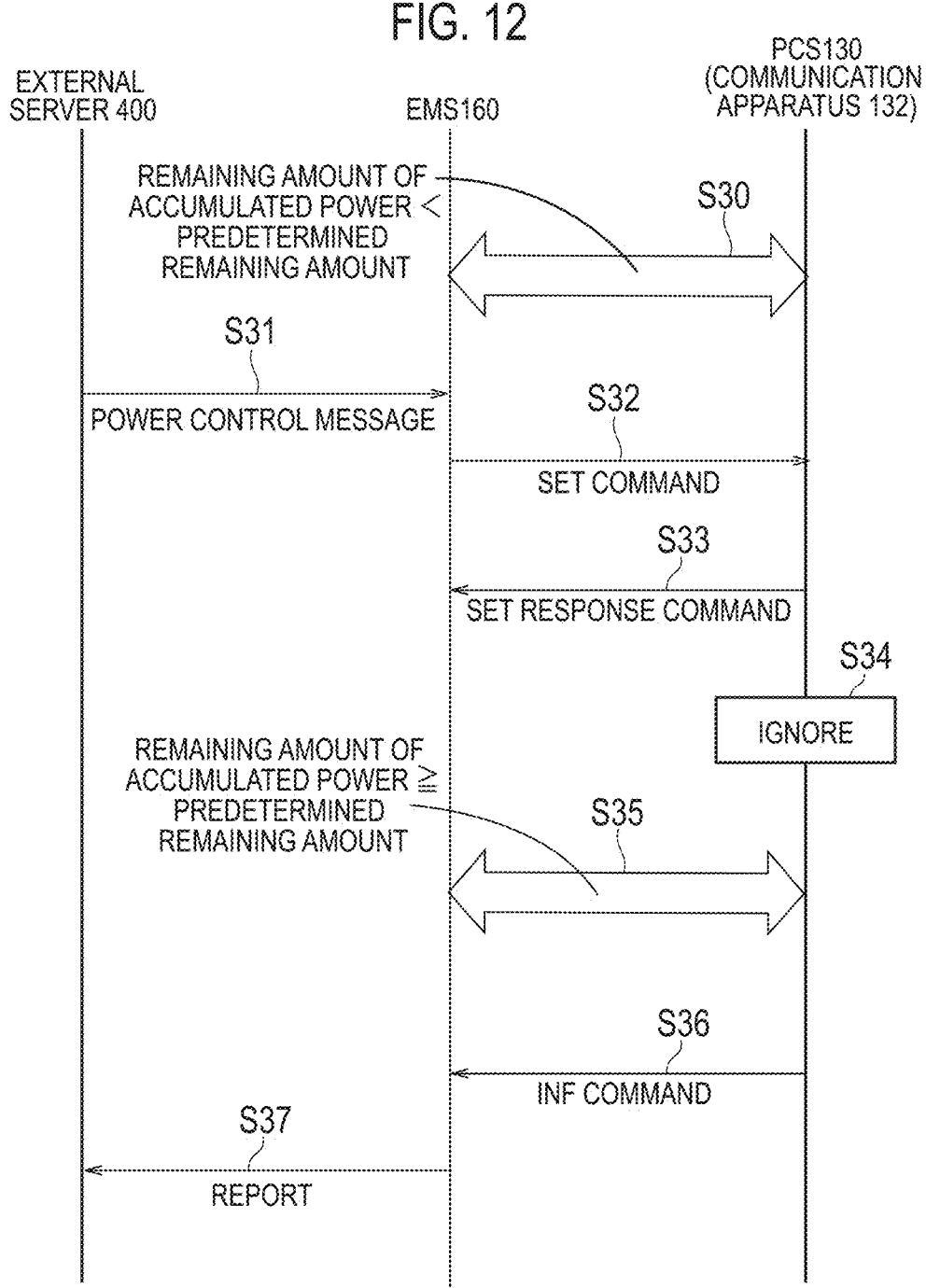
FIG. 12 is a sequence diagram illustrating a management method according to a first variant.

As illustrated in FIG. 12, in step S30, the remaining amount of accumulated power in the rechargeable battery 120 is below the first remaining amount. The remaining amount of accumulated power in the rechargeable battery 120 may be shared between the PCS 130 and the EMS 160.

In step S31, the external server 400 transmits a power control message to the EMS 160.

In step S32, the EMS 160 transmits a SET command corresponding to the power control message to the PCS 130.

In step S33, the PCS 130 transmits a SET response command to the SET command to the EMS 160.

In step S34, the PCS 130 ignores the power control message received from the EMS 160. When ignoring the power control message, the PCS 130 may perform an operation instructed by a user operation, for example.

In step S35, the remaining amount of accumulated power in the rechargeable battery 120 becomes the first remaining amount or more.

In step S36, the PCS 130 transmits a message indicating the remaining amount of accumulated power in the rechargeable battery 120 to the EMS 160. Such a message is an INF command described above, for example.

In step S37, the EMS 160 transmits the message indicating the remaining amount of accumulated power in the rechargeable battery 120 to the external server 400.

Herein, when the remaining amount of accumulated power in the rechargeable battery 120 reaches the first remaining amount, the PCS 130 may operate in response to the SET command ignored in step S34.

Fourth, a case where the EMS 160 suspend transmission of a power control message while the remaining amount of accumulated power in the rechargeable battery 120 is below the first remaining amount will be described with reference to FIG. 13.

As illustrated in FIG. 13, in step S40, the remaining amount of accumulated power in the rechargeable battery 120 is below the first remaining amount. The remaining amount of accumulated power in the rechargeable battery 120 may be shared between the PCS 130 and the EMS 160.

In step S41, the external server 400 transmits a power control message to the EMS 160.

In step S42, the EMS 160 suspend transmission of a SET command corresponding to the power control message. When transmission of the power control message is suspended, the PCS 130 may perform an operation instructed by a user operation, for example.

In step S43, the remaining amount of accumulated power in the rechargeable battery 120 becomes the first remaining amount or more.

In step S44, the PCS 130 transmits a message indicating the remaining amount of accumulated power in the rechargeable battery 120 to the EMS 160. Such a message is an INF command described above, for example.

In step S45, the EMS 160 transmits the message indicating the remaining amount of accumulated power in the rechargeable battery 120 to the external server 400.

Herein, when the remaining amount of accumulated power in the rechargeable battery 120 becomes the first remaining amount or more, the EMS 160 may transmit the SET command suspended in step S42.

(Operations and Effects)

According to the embodiment, the PCS 130 operates without following a power control message in the predetermined state. Thus, the principle that an operation instructed by a power control message is prioritized over an operation instructed by a user operation is not observed on purpose, and thus the PCS 130 can be appropriately controlled.

According to the embodiment, when the power system 10 returns from the power-down state to the recovery state, a message indicating the remaining amount of accumulated power in the rechargeable battery 120 is transmitted to the external server 400. Therefore, the external server 400 grasps the remaining amount of accumulated power in the rechargeable battery 120 so that the external server 400 can appropriately restart controlling the rechargeable battery 120, thereby stabilizing the power system 10.

According to the embodiment, when the remaining amount of accumulated power in the rechargeable battery 120 is below the first remaining amount, the PCS 130 operates without following a power control message. Thus, the principle that an operation instructed by a power control message is prioritized over an operation instructed by a user operation is not observed on purpose, so that the PCS 130 can be appropriately controlled.

According to the embodiment, when the remaining amount of accumulated power in the rechargeable battery 120 becomes the first remaining amount or more, a message indicating the remaining amount of accumulated power in the rechargeable battery 120 is transmitted to the external server 400. Thus, the external server 400 grasps the remaining amount of accumulated power in the rechargeable battery 120 so that the external server 400 can appropriately restart controlling the rechargeable battery 120, thereby stabilizing the power system 10.

Other Embodiment

The present invention has been described by way of the above embodiment, but the description and the drawings as part of the disclosure should not be considered as limiting the present invention. Various alternative embodiments, examples, and operation techniques will be apparent to those skilled in the art on the basis of the disclosure.

The embodiment has been described assuming that the predetermined format used for communication between the communication apparatus 132 and the EMS 160 conforms to the ECHONET Lite system. However, the embodiment is not limited thereto. The predetermined format may be any format standardized to be used in the facility 100.

The PCS 130 (multi-PCS) controlling the solar battery 110 and the output of the rechargeable battery 120 has been described according to the embodiment by way of example. However, the embodiment is not limited thereto. The PCS 130 may be directed to controlling the solar battery 110 and may be directed to controlling the output of the rechargeable battery 120.

According to the embodiment, the communication apparatus 132 receives a SET command as an exemplary power control message from the EMS 160. However, the embodiment is not limited thereto. The EMS 160 may transmit a SET command as an exemplary power control message to the remote controller configured to operate the conversion apparatus 131. The remote controller may be assumed as the communication apparatus 132.

According to the embodiment, a power control message received from the external server 400 or the user terminal 500 is transmitted from the EMS 160 to the PCS 130 in the form of a SET command. The EMS 160 may appropriately convert the power control message received from the external server 400 or the user terminal 500, and may then transmit the converted power control message (the SET command, for example) to the PCS 130. The converted power control message is also an exemplary power control message controlling the conversion apparatus 131. In such a case, the EMS 160 may transmit a plurality of SET commands to the PCS 130 at appropriate timings in order to control the PCS 130 on the basis of the power control message received from the external server 400 or the user terminal 500.

According to the embodiment, the EMS 160 transmits a message indicting the remaining amount of accumulated power in the rechargeable battery 120 to the external server 400. Such a message may include information indicating the remaining amount of accumulated power (dischargeable capacity) illustrated in FIG. 2, may include the accumulated capacity and the lower SOC illustrated in FIG. 2, and may include a rate (%) of the remaining amount of accumulated power (dischargeable capacity) relative to the total capacity. Further, the message may include information indicating the remaining amount of charged power (chargeable capacity) illustrated in FIG. 2, may include the accumulated capacity and the upper SOC illustrated in FIG. 2, and may include a rate (%) of the remaining amount of charged power (chargeable amount) relative to the total capacity. The message may include information indicating the total capacity.

The embodiment has been described assuming that the first communication unit 132A and the second communication unit 132B are in different configurations, but the first communication unit 132A and the second communication unit 132B may be integrated. That is, the first communication unit 132A may serve as the second communication unit 132B.

Though not particularly limited in the embodiment, the rechargeable battery 120 as an exemplary distributed power source may be provided in the facility 100, and may be provided in an electric vehicle (EV).

Additionally, the entire contents of Japanese Patent Application No. 2016-103058 (filed on May 24, 2016) are incorporated in the present specification by its reference.

The invention claimed is:

1. A management system comprising:
a power conversion apparatus configured to convert, at least one of output power from a distributed power source and input power into the distributed power source, into AC power or DC power; and
a management apparatus, the management apparatus comprising:
a receiver configured to receive a power control message controlling the power conversion apparatus, from an external server of a business operator that manages a power system to which the distributed power source is connected; and
a transmitter configured to transmit the power control message to the power conversion apparatus,
wherein
the power conversion apparatus is configured to operate without following the power control message when there is a predetermined state, and
the power conversion apparatus is configured to prioritize an operation instructed by the power control message over an operation instructed by a user operation, in a state other than the predetermined state.

2. The management system according to claim 1, wherein the predetermined state includes at least one of the following states:
a power-down state, wherein the power system is power-down;
a self-sustained running state, wherein the power conversion apparatus is separated from the power system;
a state wherein the receiver receives a special instruction by a user operation; and
a re-interconnection waiting time state for re-interconnecting with the power system.

3. The management system according to claim 1, wherein the power conversion apparatus is configured to ignore the power control message received from the management apparatus when the predetermined state is a power-down state.

4. A management system, comprising:
a power conversion apparatus configured to convert, at least one of output power from a distributed power source and input power into the distributed power source, into AC power or DC power; and
a management apparatus, the management apparatus comprising:
a receiver configured to receive a power control message controlling the power conversion apparatus, from an external server of a business operator that manages a power system to which the distributed power source is connected; and
a transmitter configured to transmit the power control message to the power conversion apparatus,
wherein
the power conversion apparatus is configured to operate without following the power control message when there is a predetermined state, and
the transmitter is configured to suspend transmission of the power control message when the predetermined state is a power-down state.

5. A management system, comprising:
a power conversion apparatus configured to convert, at least one of output power from a distributed power source and input power into the distributed power source, into AC power or DC power; and
a management apparatus, the management apparatus comprising:
a receiver configured to receive a power control message controlling the power conversion apparatus, from an external server of a business operator that manages a power system to which the distributed power source is connected; and
a transmitter configured to transmit the power control message to the power conversion apparatus,
wherein
the power conversion apparatus is configured to operate without following the power control message when there is a predetermined state,
the distributed power source is a rechargeable battery, and
when the power system returns from a power-down state to a recovery state, the transmitter is configured to transmit a message indicating a remaining amount of accumulated power in the rechargeable battery to the external server.

6. A management system, comprising:
a power conversion apparatus configured to convert, at least one of output power from a distributed power source and input power into the distributed power source, into AC power or DC power; and
a management apparatus, the management apparatus comprising:
a receiver configured to receive a power control message controlling the power conversion apparatus, from an external server of a business operator that manages a power system to which the distributed power source is connected; and
a transmitter configured to transmit the power control message to the power conversion apparatus,
wherein
the power conversion apparatus is configured to operate without following the power control message when there is a predetermined state,
the distributed power source is a rechargeable battery, and
the power conversion apparatus is configured to operate without following the power control message when the power control message is a message for instructions to discharge, and a remaining amount of accumulated power in the rechargeable battery is either below a first remaining amount or above a predetermined second remaining amount, wherein the predetermined second remaining amount is higher than the first remaining amount.

7. The management system according to claim 6, wherein the power conversion apparatus is configured to ignore the power control message received from the management apparatus, when the power control message is a message for instructions to discharge, and the remaining amount of accumulated power in the rechargeable battery is below the first remaining amount or exceeds the predetermined second remaining amount.

8. The management system according to claim 6, wherein the transmitter is configured to suspend transmission of the power control message when the power control message is a message for instructions to discharge, and the remaining amount of accumulated power in the rechargeable battery is below the first remaining amount or exceeds the predetermined second remaining amount.

9. A management method used in a management system comprising a management apparatus, a power conversion apparatus configured to convert, at least one of output power from a distributed power source and input power into the distributed power source, into AC power or DC power, and a display apparatus configured to display a state of the power conversion apparatus, the method comprising:
transmitting a power control message controlling the power conversion apparatus, from an external server of a business operator that manages a power system to which the distributed power source is connected, to the management apparatus;
transmitting the power control message, from the management apparatus to the power conversion apparatus; and operating the power conversion apparatus without following the power control message when a predetermined state is detected, wherein the power conversion apparatus prioritizes an operation instructed by the power control message over an operation instructed by a user operation, in a state other than the predetermined state.

10. A power conversion apparatus provided in a management system comprising a management apparatus, and configured to convert, at least one of output power from a distributed power source and input power into the distributed power source, into AC power or DC power, the power conversion apparatus comprising:

a receiver configured to receive a power control message controlling the power conversion apparatus from the management apparatus; and a controller configured to control an operation of the power conversion apparatus without following the power control message when in a predetermined state, wherein the controller is configured to prioritize an operation instructed by the power control message over an operation instructed by a user operation, in a state other than the predetermined state.

11. A management apparatus provided in a management system comprising a power conversion apparatus configured to covert, at least one output power from a distributed power source and input power into the distributed power source, into AC power or DC power, the management apparatus comprising:

a receiver configured to receive a power control message controlling the power conversion apparatus from an external server of a business operator that manages a power system to which the distributed power source is connected;

a transmitter configured to transmit the power control message to the power conversion apparatus; and a controller configured to operate the power conversion apparatus without following the power control message when a predetermined state is met, wherein the controller is configured to prioritize an operation corresponding to the power control message over an operation instructed by a user operation, in a state other than the predetermined state.

* * * * *